United States Patent
Hwang et al.

(10) Patent No.: US 9,882,903 B2
(45) Date of Patent: Jan. 30, 2018

(54) METHOD FOR PROTECTING PERSONAL INFORMATION IN AUDIENCE MEASUREMENT OF DIGITAL BROADCASTING SYSTEM

(75) Inventors: Sung-Oh Hwang, Yongin-si (KR); Sergey Nikolayevich Seleznev, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 455 days.

(21) Appl. No.: 13/030,804

(22) Filed: Feb. 18, 2011

(65) Prior Publication Data

US 2011/0203002 A1     Aug. 18, 2011

(30) Foreign Application Priority Data

Feb. 18, 2010 (KR) .................. 10-2010-0014849
Apr. 7, 2010 (KR) .................. 10-2010-0032068

(51) Int. Cl.
*H04H 60/32* (2008.01)
*H04L 29/06* (2006.01)
(Continued)

(52) U.S. Cl.
CPC .............. *H04L 63/10* (2013.01); *H04L 9/32* (2013.01); *H04L 9/3234* (2013.01); *H04L 63/0421* (2013.01); *H04N 21/25883* (2013.01); *H04N 21/25891* (2013.01); *H04N 21/4182* (2013.01); *H04N 21/44204* (2013.01); *H04N 21/6131* (2013.01); *H04L 2209/60* (2013.01); *H04L 2209/601* (2013.01); *H04L 2209/80* (2013.01);
(Continued)

(58) Field of Classification Search
CPC ......... H04N 21/44222; H04N 21/4532; H04N 21/6582; H04N 21/812
USPC ...................................................... 725/9–21
See application file for complete search history.

(56) References Cited

U.S. PATENT DOCUMENTS 7,003,790 B1   2/2006 Inoue et al.
2002/0178441 A1  11/2002 Hashimoto
(Continued)

FOREIGN PATENT DOCUMENTS

CN        1452820       10/2003
JP      2001-060928      3/2001
(Continued)

OTHER PUBLICATIONS

Anne-Marie Praden et al., Resolution H004 TS SPCP, Open Mobile Alliance, XP064031399, OMA-BCAST-V1_1-2010-0023R01-CR_Resolution_H004_SPCP.doc, Feb. 17, 2010, 26 pages.
(Continued)

*Primary Examiner* — Joshua Taylor
(74) *Attorney, Agent, or Firm* — The Farrell Law Firm, P.C.

(57) ABSTRACT

A method for protecting personal information in Audience Measurement (AM) of a digital broadcasting system is provided, including inserting an indicator, which notifies whether a consumption pattern of a service or content provided by a service provider can be measured, into a service guide, to which the information of the service or content is provided by a service provider; and determining whether the AM can be executed for the service or content in accordance with the indicator when the AM function is implemented in a terminal.

14 Claims, 6 Drawing Sheets

Event Type

| Value | Description |
|---|---|
| 0x00 | Zapping |
| 0x01 | Terminating a parental rated service |
| 0x02 | AM allowed Service/Content |
| 0x03 | AM disallowed Service/Content |
| 0x04 - 0x7F | Reserved for future use |
| 0x80 - 0xFF | Reserved for specific event proprietary signalling (e.g. due to local regulations on parental control) |

Coding of Event Type Parameter according to event type

| Event Type | Description of Event type parameter | Value | M/O | coding | Length (bytes) |
|---|---|---|---|---|---|
| Terminating a parental rated service (0x01) | Identifier of the service | Key_Domain_ID \|\| SEK/PEK_ID | M | As defined in section Error! No reference source is found | 7 |
| AM allowed Service/ Content(0x02) | Identifier of the service or content | anyURI | M | As defined by BCAST SG | L3 |
| AM disallowed Service/ content(0x03) | Identifier of the service or content | anyURI | M | As defined by BCAST SG | L3 |

(51) Int. Cl.
  *H04L 9/32* (2006.01)
  *H04N 21/258* (2011.01)
  *H04N 21/418* (2011.01)
  *H04N 21/61* (2011.01)
  H04N 21/45 (2011.01)
  H04N 21/442 (2011.01)
  H04N 21/81 (2011.01)
  H04N 21/658 (2011.01)

(52) U.S. Cl.
  CPC ... *H04N 21/44222* (2013.01); *H04N 21/4532* (2013.01); *H04N 21/6582* (2013.01); *H04N 21/812* (2013.01)

(56) References Cited

U.S. PATENT DOCUMENTS

| | | | | |
|---|---|---|---|---|
| 2005/0228814 | A1* | 10/2005 | Plow et al. | 707/102 |
| 2005/0276237 | A1* | 12/2005 | Segal | H04L 12/12 370/312 |
| 2006/0031440 | A1 | 2/2006 | Ashley | |
| 2007/0136753 | A1 | 6/2007 | Bovenschulte et al. | |
| 2008/0103978 | A1* | 5/2008 | Houston | 705/59 |
| 2008/0108297 | A1 | 5/2008 | Bettinger | |
| 2008/0244657 | A1 | 10/2008 | Arsenault et al. | |
| 2010/0257548 | A1* | 10/2010 | Lee et al. | 725/9 |

FOREIGN PATENT DOCUMENTS

| | | |
|---|---|---|
| JP | 2001-069098 | 3/2001 |
| JP | 2001-078167 | 3/2001 |
| JP | 2004-112717 | 4/2004 |
| JP | 2005-020432 | 1/2005 |
| JP | 2006-506883 | 2/2006 |
| WO | WO 2010/114321 | 10/2010 |
| WO | WO 2011/054910 | 5/2011 |

OTHER PUBLICATIONS

European Search Report dated Jan. 20, 2017 issued in counterpart application No. 11744875.3-1870, 8 pages.

* cited by examiner

| Name | Type | Category | Cardinality | Description | Data Type |
|---|---|---|---|---|---|
| Service | E | | | 'Service' fragment<br>Contains the following attributes:<br>id<br>version<br>validFrom<br>validTo<br>globalServiceID<br>weight<br>hidden<br>baseCID<br>emergency<br>UDBAllowed<br>AMAllowed<br><br>Contains the following elements:<br>ProtectionKeyID<br>ServiceType<br>Name<br>Description<br>AudioLanguage<br>TextLanguage<br>ParentalRating<br>TargetUserProfile<br>Genre<br>Extension<br>PreviewDataReference<br>BroadcastArea<br>TermsOfUse<br>Popularity<br>PrivateExt | |
| Omitted | | | | | |
| AMallowed | A | NO/TO | 0..1 | This attribute indicates whether Audience Measurement for this service is allowed or not. If the value of AMallowed is true, then terminal or smartcard SHALL measure the consumption of this service. If not, terminal or smartcard SHALL NOT measure the consumption of this service. | Boolean |
| Omitted | | | | | |
| | | | | | |

FIG.4

| Name | Type | Category | Cardinality | Description | Data Type |
|---|---|---|---|---|---|
| Content | E | | | 'Content' fragment<br>Contains the following attributes:<br>id<br>version<br>validFrom<br>validTo<br>globalContentID<br>emergency<br>baseCID<br>UDBAllowed<br>AMallowed<br><br>Contains the following elements:<br>ServiceReference<br>ProtectionKeyID<br>Name<br>Description<br>StartTime<br>EndTime<br>AudioLanguage<br>TextLanguage<br>Length<br>ParentalRating<br>TargetUserProfile<br>Genre<br>Extension<br>PreviewDataReference<br>BroadcastArea<br>TermsOfUse<br>Popularity<br>Freshness<br>Terminal Provisioning<br>PrivateExt | |
| Omitted | | | | | |
| AMallowed | A | NO/TO | 0..1 | This attribute indicates whether Audience Measurement for this service is allowed or not. If the value of AMallowed is true, then terminal or smartcard SHALL measure the consumption of this service. If not, terminal or smartcard SHALL NOT measure the consumption of this service. | Boolean |
| Omitted | | | | | |
| | | | | | |

FIG.5

Event Type

| Value | Description |
|---|---|
| 0x00 | Zapping |
| 0x01 | Terminating a parental rated service |
| 0x02 | AM allowed Service/Content |
| 0x03 | AM disallowed Service/Content |
| 0x04 - 0x7F | Reserved for future use |
| 0x80 - 0xFF | Reserved for specific event proprietary signalling (e.g. due to local regulations on parental control) |

Coding of Event Type Parameter according to event type

| Event Type | Description of Event type parameter | Value | M/O | coding | Length (bytes) |
|---|---|---|---|---|---|
| Terminating a parental rated service (0x01) | Identifier of the service | Key_Domain_ID \|\| SEK/PEK_ID | M | As defined in section Error! No reference source is found | 7 |
| AM allowed Service/ Content(0x02) | Identifier of the service or content | anyURI | M | As defined by BCAST SG | L3 |
| AM disallowed Service/ content(0x03) | Identifier of the service or content | anyURI | M | As defined by BCAST SG | L3 |

FIG.6

METHOD FOR PROTECTING PERSONAL INFORMATION IN AUDIENCE MEASUREMENT OF DIGITAL BROADCASTING SYSTEM

PRIORITY

This application claims priority under 35 U.S.C. §119(a) to applications entitled "Method For Protecting Personal Information In Audience Measurement Of Digital Broadcasting System" filed in the Korean Intellectual Property Office on Feb. 18, 2010 and Apr. 7, 2010 and assigned Serial Nos. 10-2010-0014849 and 10-2010-0032068, respectively, the entire disclosures of which are hereby incorporated herein by reference.

BACKGROUND OF THE INVENTION

1. Field of the Invention

The present invention relates generally to a method capable of securing personal privacy information (e.g., race, religion, sexual orientation, and the like) in Audience Measurement ("AM") for measuring users' utilization patterns of services or in a digital broadcasting system.

2. Description of the Related Art

It is expected that a service for providing content or advertisements suitable for users' tastes by measuring users' utilization or consumption patterns in broadcasting services or content-providing services will be widely used as one of user-customized services. A basic function to be necessarily executed for this service is Audience Measurement (AM). The basic function of AM is to record the services which are utilized by users, when the users utilized the services, where the users utilized the services, how long the users utilized the services, and how the users utilized the services. An AM action may consist of transmitting an AM execution command, executing AM, and reporting an AM execution result, wherein an AM data storage place may be a content consuming device or a server managed by a service provider. Since AM records all of the content and services utilized by users, all of the users' personal information may be disclosed. Although many countries around the world prevent, by law, anyone from recording or using data, from which a user's characteristics may be inferred from a service or content utilized by the user, a user's race, religion or sexual orientation may be guessed. Thus, there is a problem in that the current broadcasting service technology are not in line with such legal regulations.

In the prior art, if a service provider executes AM, using a terminal or a smart card, the terminal or the smart card may record the AM data even for services or content which may allow a user's sensitive characteristics to be disclosed.

SUMMARY OF THE INVENTION

Accordingly, the present invention has been made to solve the above-mentioned problems occurring in the prior art, and the present invention provides a method for preventing a terminal or a smart card from recording AM data related to a service or content that may allow a user's sensitive characteristics to be disclosed.

Moreover, the present invention provides a method for preventing a smart card from executing AM related to a service or content, from which a user's sensitive characteristics may be inferred.

In accordance with an aspect of the present invention, there is provided a method for protecting personal information in Audience Measurement (AM) in a digital broadcasting system, including inserting an indicator, which allows or disallows AM for a service or content provided by a service provider, into a service guide for providing information related to the service or content; receiving, by a terminal, the inserted indicator; executing, by the terminal, the AM on the basis of the content of the received indicator; transmitting information from the terminal to an AM function-equipped smart card on the basis of the content of the received indicator; and executing, by the AM function-equipped smart card, the AM on the basis of the information transmitted to the AM function-equipped card.

In accordance with another aspect of the present invention, there is provided a method for protecting personal information in AM in a digital broadcasting system, including inserting an indicator, which notifies whether a consumption pattern of a service or content provided by a service provider can be measured, into a service guide for providing information related to the service or content; and determining whether the AM for the service or content can be executed in accordance with the indicator when the AM function is implemented in a terminal or a smart card.

If the AM function is implemented in a smart card connected to the terminal, the method may further include transmitting the content of the indicator from the terminal to the smart card; and determining whether the AM for the service or content can be executed in accordance with the indicator when the smart card executes the AM.

BRIEF DESCRIPTION OF THE DRAWINGS

The above and other aspects, features and advantages of the present invention will be more apparent from the following detailed description taken in conjunction with the accompanying drawings, in which:

FIG. 4 illustrates an AM-allowed indicator inserted into a service fragment of the Open Mobile Alliance Mobile Broadcasting service (OMA BCAST), in accordance with an embodiment of the present invention;

FIG. 5 illustrates an AM-allowed indicator inserted into a content fragment of OMA BCAST in accordance with an embodiment of the present invention; and FIG. 6 illustrates event messages used when transmitting an AM-allowed indicator value as in step 312 of FIG. 3 in accordance with an embodiment of the present invention.

DETAILED DESCRIPTION OF THE EMBODIMENTS OF THE PRESENT INVENTION

Figure 1:
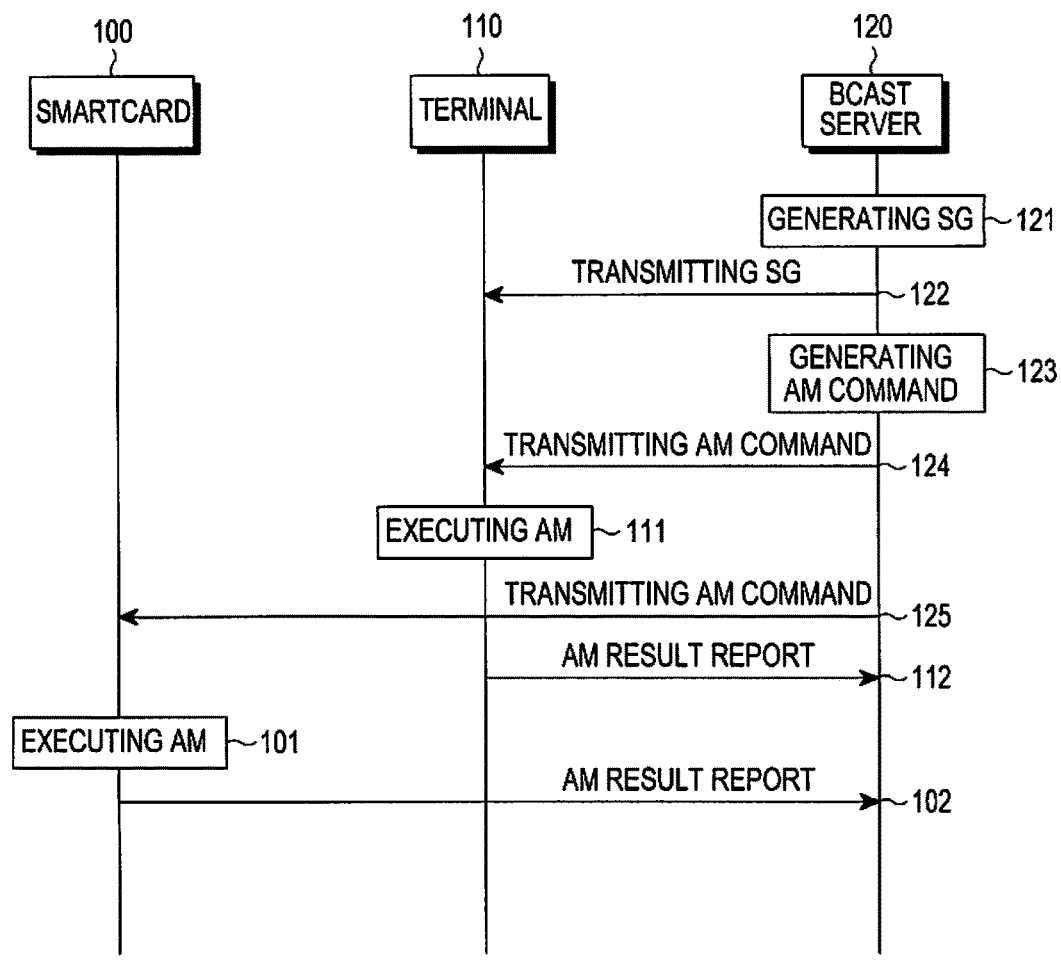
FIG. 1 illustrates the steps of executing AM, to which the present invention is applied.

Embodiments of the present invention will be described with reference to the accompanying drawings. In the following description, the same elements will be designated by the same reference numerals although they are shown in different drawings.

Further, various specific definitions found in the following description are provided only to help with the general understanding of the present invention, and it is apparent to those skilled in the art that the present invention can be implemented without such definitions. Further, in the following description of the present invention, a detailed description of known functions and configurations incorporated herein will be omitted when it may make the subject matter of the present invention rather unclear.

In the following detailed description, representative embodiments in the present invention for achieving the above-mentioned technical solutions will be discussed. In addition, the names of objects defined in the OMA BCAST, which is a standard of a mobile broadcast application layer technology, will also be used for the convenience of description of the present invention. However, the standard and names used do not limit the scope of the present invention, and the present invention can be applied to a system having similar technical characteristics.

FIG. 1 illustrates the steps of executing AM, to which the present invention is applied, wherein the unnecessary steps are omitted. A BCAST server 120 is a server for providing a BCAST service, wherein the BCAST server 120 generates a Service Guide (SG) in step 121. The service guide provides information items, such as descriptions of services and content, and methods, time and security for receiving the services and content, to a terminal. In step 122, the BCAST server 120 transmits the SG generated in step 121 to the terminal 110 through a broadcasting channel or bidirectional channel. The BCAST server, which has transmitted the SG in step 122, generates an AM command in step 123, wherein the AM command is a command to be used for Audience Measurement. The contents of the command include a measurement range, reporting times, or the like, and are transmitted to the terminal 110 through step 124.

A message transmitted in step 124 may be transmitted to the terminal 110 either through a broadcasting channel or through a bidirectional channel. The transmission pattern may use a BCAST notification message, an Short Message Service (SMS) message or a separate message. Additionally, although the time point for AM command transmission may be prior to the time point of BCAST SG transmission, it is assumed in the present invention that the AM command transmission is executed after the BCAST SG transmission. Depending on the AM implementation position, the BCAST server 120 may transmit the AM command to a smart card in step 125.

The smart card 100 is an entity for a security solution of a broadcasting service, wherein the smart card 100 may be a Universal Mobile Telecommunications System (UMTS) Subscriber Identity Module (SIM) or a similar software or hardware. Although the AM execution action in step 111 and the AM execution action in step 101 are different from each other in that they are executed by the terminal 110 and the smart card 100, respectively, they execute the basic AM actions as to who watched, which services were watched, where the services were watched and how many times the services were watched, as these are the most basic information items in AM as described in the above.

Additionally, the result is reported to the BCAST server 120 through the AM result report in step 112 or through the AM result report in step 102. The AM result report in step 112 and the AM result report in step 102 may also be sent to a third server beyond the BCAST server 120. In such a case, the address of the third server is provided to the AM command in step 124 or to the AM command in step 125. As shown in FIG. 1, the terminal 110 and the smart card 100 will record and report a user's consumption pattern for all of the services and content watched by the user in accordance with the AM command in step 124 or the AM command in step 125. Although a great number of countries in the world apply strong legal sanctions against collecting or processing data from which a user's sensitive information may be known, there is a problem in that under the existing technical conditions, no technology can avoid these legal sanctions.

Figure 2:
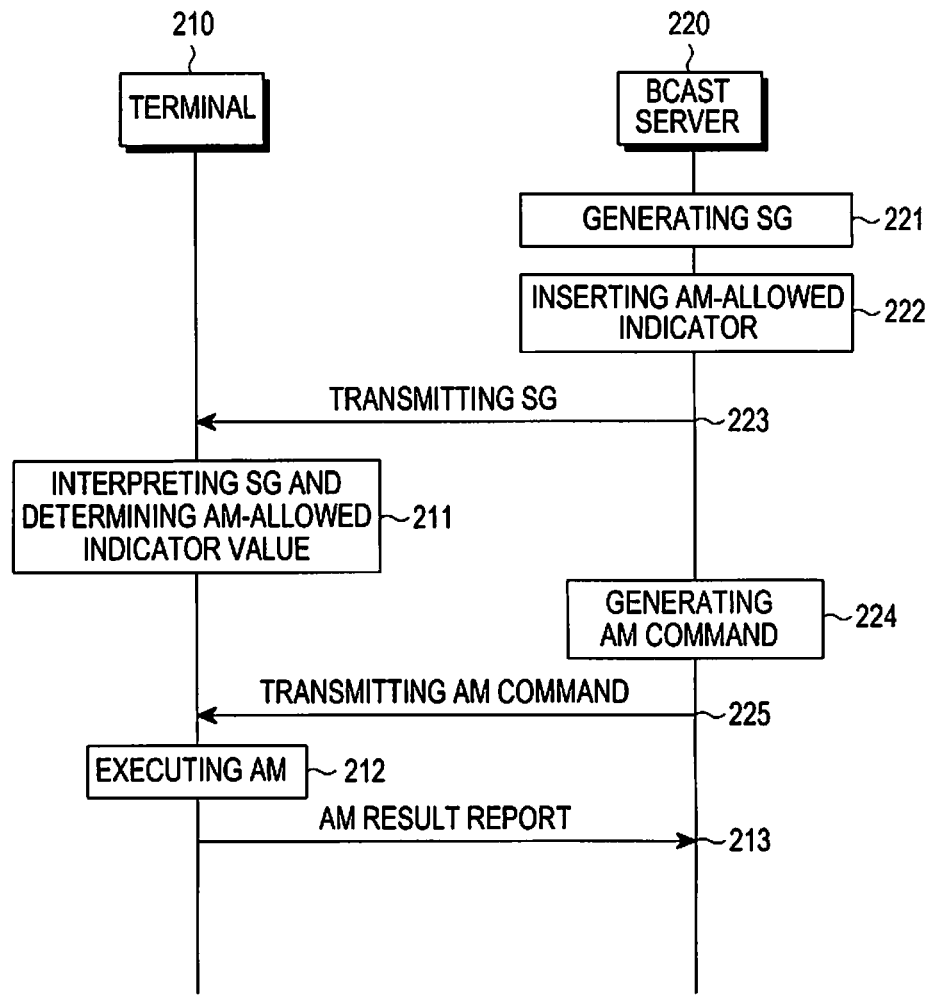
FIG. 2 is a flowchart illustrating a case in which AM is implemented in a terminal in accordance with a first embodiment of the present invention.
Figure 3:
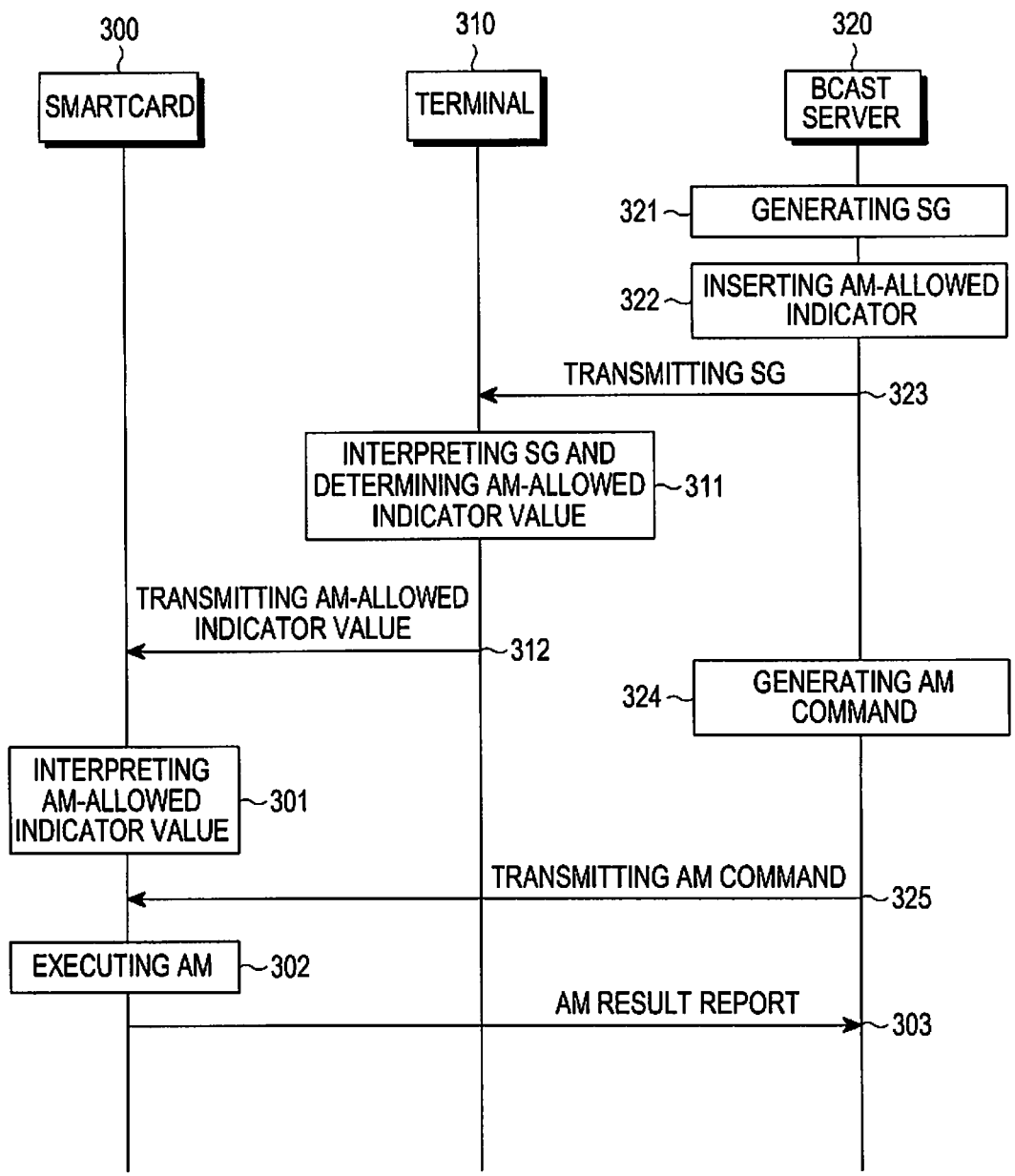
FIG. 3 is a flowchart illustrating a case in which AM is implemented in a smart card in accordance with a second embodiment of the present invention.

FIGS. 2 and 3 are flowcharts of actions for protecting a user's sensitive information, according to embodiments of the present invention. Below, a case in which AM is implemented in a terminal will be described as a first embodiment, and a case in which AM is implemented in a smart card will be described as a second embodiment.

FIG. 2 is a flowchart illustrating a case in which AM is implemented in a terminal in accordance with the first embodiment of the present invention, and FIG. 3 is a flow chart of actions in a case in which AM is implemented in a smart card in accordance with the second embodiment of the present invention.

A BCAST server 220 generates an SG in step 221, and then inserts an AM-allowed indicator for a specific service or content in step 222. FIG. 4 illustrates an AM-allowed indicator inserted into a "Service" fragment of OMA BCAST in accordance with an embodiment of the present invention, wherein the 'Service' fragment serves to provide brief information as to a service, and information for languages and broadcast regions where the service is provided, and those parts irrelevant to the description of the present invention are not shown in FIG. 4.

In FIG. 4, the "Name" column indicates names of attributes and elements, the "Type" column indicates whether corresponding information is an attribute or an element, the "Category" column indicates whether a server and a terminal shall necessarily execute transmission or reception, the "Cardinality" column indicates how many times the corresponding attribute or element is repeated, the "Description" column indicates descriptions for the attributes and elements, and the "Data Type" column indicates the display patterns of attributes and elements.

FIG. 5 illustrates an AM-allowed indicator inserted into a 'Content' fragment.

The "Type," "Category," "Cardinality," and "Description" in the first raw of FIG. 5 correspond to those of FIG. 4, respectively. Each of the AM-allowed indicators of FIGS. 4 and 5 serves as an indicator as to whether AM can be executed for a corresponding service or content. If the AM-allowed indicator is set to "1," which means that the AM-allowed indicator is true, and hence AM can be executed for the corresponding service or content, and if the AM-allowed indicator is set to "0," AM cannot be executed for the corresponding service or content.

The terminal 210 determines whether AM is executed for the corresponding service or content in accordance with the command content of the AM-allowed indicator. Although the AM-allowed indicator is presented as an attribute in FIGS. 4 and 5, and its category is proposed as (Network Optional/Terminal Optional) NO/TO, the AM-allowed indicator may be presented as an element, and its category may be provided in any other type. Additionally, as shown in FIG. 2, the BCAST server 220 transmits an SG in step 223, after inserting the AM-allowed indicator. The SG transmission process in step 223 is the same as that shown in FIG. 1.

The terminal 210 determines the value of the AM-allowed indicator in each service and content fragment after interpreting the SG in step 211. The BCAST server 220 generates an AM command in step 224, and transmits the AM command in step 225. The AM command generation in step 225 and the AM command transmission in step 225 are the same as those shown in FIG. 1, respectively. The terminal 210, which has received the AM command in step 225, executes AM in step 212, which is different from that shown in FIG. 1 in that the terminal 210 does not execute AM, except for a service or content with a positive AM-allowed indicator value.

Therefore, since AM is not executed for a service or content, which may allow a user's sensitive information, such as religion, race, and sexual orientation, to be revealed, the user's sensitive information can be protected. After finishing AM execution, in step 213, the terminal 210 reports the AM result to the BCAST server 220 or transmits the result to the third server 3, the address of which is provided from the AM command generated in step 225.

FIG. 3 illustrates actions when the AM function is implemented in a smart card in accordance with the second embodiment of the present invention. Since the actions 321, 322 and 323 of the BCAST server 320 are the same as the actions 221, 222 and 223 of FIG. 2, respectively, the detailed description thereof will be omitted. After receiving an SG, the terminal interprets the SG in step 311, and extracts an AM-allowed indicator value. In FIG. 3, since the AM function is implemented in the smart card 300, the AM-allowed indicator value shall be transmitted to the smart card 300 rather than being used by the terminal 310.

FIG. 6 illustrates event messages to be used when an AM-allowed indicator value is transmitted as in step 312 of FIG. 3. The event messages are those exchanged between the smart card 300 and the terminal 310 when a special event occurs, wherein although such event messages were used when zapping (e.g., changing a channel) occurs or a parental control is executed for a service or content, the present invention proposes to make the event messages be capable of being used for notifying whether AM for a specific service or content is allowed.

The Event Type in FIG. 6 indicates characteristics of events, wherein the present invention adds two new events of an AM-allowed service/content and an AM disallowed service/content. A value for the AM-allowed service/content event is an indicator for a service provided from a service fragment of the BCAST SG, or an indicator for content provided from a content fragment of the BCAST SG. Referring to FIG. 3, if there is an indicator which can clearly identify a service and content between the smart card 300 and the terminal 310 beyond the indicators provided from the service fragment or the content fragment, such an indicator may be used. Although the present invention proposes the values of the service or content as any URI, it is possible to employ strings or other data expression methods. The smart card 300 determines an AM-allowed service and content in step 301 on the basis the information received in step 312, and then receives an AM execution command through step 325. Then, in step 302, the smart card 300 executes AM, and in step 303, the smart card 300 transmits the result of AM to the BCAST server 320 or to the third server provided by the AM command received in step 325. Like the actions of FIG. 2, it is clear that a user's sensitive information will be included.

The methods described above may be implemented as a program, and may be stored in a recorded medium (e.g., a CD ROM, RAM, a floppy disc, a hard disc, a magneto-optical disc, a flash memory or the like). Such a process will not described in further detail since it can be easily embodied by an ordinary person skilled in the art.

According to another embodiment of the present invention, an AM-allowed indicator is not inserted into a service fragment and a content fragment, but an AM-disallowed indicator is inserted into a service fragment and a content fragment. A position of the AM-disallowed indicator may be the same as a position of the AM-allowed indicators shown in FIGS. 3 and 4. If an AM-disallowed value is true, the AM-allowed indicator means that an AM for the corresponding service or contents is not allowed. If the AM-disallowed value is false, the AM-allowed indicator means that the AM for the corresponding service or content is allowed. Further, when the AM-disallowed is used, the AM for the corresponding service or contents may be implicitly allowed when the AM-disallowed indicator does not exist.

An object of the present invention is to provide a method for preventing a user's sensitive characteristics from being used in executing AM, wherein the present invention proposes a method for securing a user's privacy as required by privacy laws of various countries by making an AM executing terminal or smart card execute AM in such a manner that a user's sensitive characteristics cannot be disclosed to others.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method for transmitting a service guide in a digital broadcasting system, the method comprising:
   generating, by a server, the service guide including a service fragment that includes control information for a service and a content fragment that includes control information for content, wherein the service fragment includes a first indicator indicating whether audience measurement (AM) is allowed or disallowed for the service by a terminal, and the content fragment includes a second indicator indicating whether the AM is allowed or disallowed for the content by the terminal;
   transmitting, by the server, the service guide to the terminal;
   receiving, by the server, first AM data for the service, from the terminal, if the first indicator indicates that the AM is allowed for the service; and
   receiving, by the server, second AM data for the content, from the terminal, if the second indicator indicates that the AM is allowed for the content.

2. The method of claim 1, further comprising:
   generating an AM command and transmitting the AM command to the terminal.

3. The method of claim 1, wherein the terminal is not allowed to perform AM related to the service if the first indicator indicates that the AM is disallowed for the service, or
   wherein the terminal is not allowed to perform AM related to the content if the second indicator indicates that the AM is disallowed for the content.

4. The method of claim 1, wherein the first AM data and the second AM data are generated in a smartcard.

5. A server in a digital broadcasting system, the server comprising:
   a transceiver configured to transmit or receive data; and
   a controller configured to:
      generate a service guide including a service fragment that includes control information for a service and a content fragment that includes control information for content, wherein the service fragment includes a first indicator indicating whether audience measurement (AM) is allowed or disallowed for the service by a terminal, and the content fragment includes a second indicator indicating whether the AM is allowed or disallowed for the content by the terminal,
control the transceiver to transmit the service guide to the terminal,
control the transceiver to receive first AM data for the service, from the terminal, if the first indicator indicates that the AM is allowed for the service, and
control the transceiver to receive second AM data for the content, from the terminal, if the second indicator indicates that the AM is allowed for the content.

6. The server of claim 5, wherein the controller is further configured to generate an AM command and transmit the AM command to the terminal.

7. The server of claim 5, wherein the terminal is not allowed to perform AM related to the service if the first indicator indicates that the AM is disallowed for the service, or
wherein the terminal is not allowed to perform AM related to the content if the second indicator indicates that the AM is disallowed for the content.

8. The server of claim 5, wherein the first AM data and the second AM data are generated in a smartcard.

9. A method for receiving a service guide by a terminal in a digital broadcasting system, the method comprising:
receiving the service guide including a service fragment and a content fragment that includes control information for a service and a content fragment that includes control information for content, wherein the service fragment includes a first indicator indicating whether audience measurement (AM) is allowed or disallowed for the service in a smartcard, and the content fragment includes a second indicator indicating whether the AM is allowed or disallowed for the content in the smartcard;
determining that the AM is allowed for the service in the smartcard if the first indicator indicates that the AM is allowed for the service in the smartcard;
determining that the AM is allowed for the content in the smartcard if the second indicator indicates that the AM is allowed for the content in the smartcard;
transmitting, to the smartcard, a first signal indicating that the AM is allowed for the service in the smartcard or a second signal indicating that the AM is allowed for the content in the smartcard;
receiving first AM data for the service, from the smartcard, if the first indicator is included in the service fragment and the first indicator indicates that the AM is allowed for the service based on the first signal; and
receiving second data for the content, from the smartcard, if the second indicator is included in the content fragment and the second indicator indicates that the AM is allowed for the content based on the second signal.

10. The method of claim 9, wherein the smartcard is configured to execute an AM process based on the first signal or an AM process based on the second signal.

11. A terminal in a digital broadcasting system, the terminal comprising:
a transceiver configured to transmit or receive data; and
a controller configured to:
control the transceiver to receive a service guide including a service fragment that includes control information for a service and a content fragment that includes control information for content, wherein the service fragment includes a first indicator indicating whether audience measurement (AM) is allowed or disallowed for the service in a smartcard, and the content fragment includes a second indicator indicating whether the AM is allowed or disallowed for the content in the smartcard,
determine that the AM is allowed for the service in the smartcard if the first indicator indicates that the AM is allowed for the service in the smartcard,
determine that the AM is allowed for the content in the smartcard if the second indicator indicates that the AM is allowed for the content in the smartcard,
control the transceiver to transmit, to the smartcard, a first signal indicating that the AM is allowed for the service in the smartcard or a second signal indicating that the AM is allowed for the content in the smartcard,
control the transceiver to receive first AM data for the service, from the smartcard, if the first indicator is included in the service fragment and the first indicator indicates that the AM is allowed for the service based on the first signal, and
control the transceiver to receive second data for the content, from the smartcard, if the second indicator is included in the content fragment and the second indicator indicates that the AM is allowed for the content based on the second signal.

12. The terminal of claim 11, wherein the smartcard is configured to execute an AM process based on the first signal or an AM process based on the second signal.

13. A method for receiving a signal by a smartcard in a digital broadcasting system, the method comprising:
receiving, from a terminal, a first signal indicating that audience measurement (AM) is allowed for a service in the smartcard and a second signal indicating that AM is allowed for a content in the smartcard;
executing an AM process for the service and an AM process for the content based on the first signal and the second signal;
reporting first AM data for the service based on the AM process for the service; and
reporting second AM data for the content based on the AM process for the content,
wherein the first signal and the second signal are determined based on a service guide including the service fragment that includes control information for the service and the content fragment that includes control information for the content, wherein the service fragment includes a first indicator indicating whether the AM is allowed or disallowed for the service in a smartcard, and the content fragment includes a second indicator indicating whether the AM is allowed or disallowed for the content in the smartcard.

14. A smartcard in a digital broadcasting system, the smartcard comprising:
a transceiver configured to transmit or receive data; and
a controller configured to:
control the transceiver to receive, from a terminal, a first signal indicating that audience measurement (AM) is allowed for a service in the smartcard or a second signal indicating that AM is allowed for a content in the smartcard,
execute an AM process for the service or an AM process for the content based on the first signal or the second signal,
control the transceiver to report first AM data for the service based on the AM process for the service, and
control the transceiver to report second AM data for the content based on the AM process for the content, wherein the first signal and the second signal are determined based on a service guide including the service fragment that includes control information for the service and the content fragment that includes control information for the content, wherein the service fragment includes a first indicator indicating whether the AM is allowed or disallowed for the service in a smartcard, and the content fragment includes a second indicator indicating whether the AM is allowed or disallowed for the content in the smartcard.

* * * * *